C. FRIEDEBORN.
Churn-Dasher.

No. 207,652.          Patented Sept. 3, 1878.

WITNESSES:          INVENTOR:
Francis McArdle          C. Friedeborn
C. Sedgwick          BY Munn & Co
         ATTORNEYS.

UNITED STATES PATENT OFFICE.

CHARLES FRIEDEBORN, OF CLARE, MICHIGAN.

IMPROVEMENT IN CHURN-DASHERS.

Specification forming part of Letters Patent No. 207,652, dated September 3, 1878; application filed July 13, 1878.

*To all whom it may concern:*

Be it known that I, CHARLES FRIEDEBORN, of Clare, in the county of Clare and State of Michigan, have invented a new and Improved Churn-Dasher, of which the following is a specification:

The object of my invention is to furnish an improved churn-dasher which will effectually break up the cream and concentrate the globules of butter as they form, and which will be easily cleaned.

The invention consists in an obtusely conical plate of tinned iron, having an axial tube or socket for attaching the handle, and an inverted central inner cone for scattering the cream, and covered at intervals with radial semicircular tubes, which are tapering toward the central socket, and provided with side apertures, the said cone being perforated underneath and between the said tubes, as will be hereinafter described.

Figure 1:
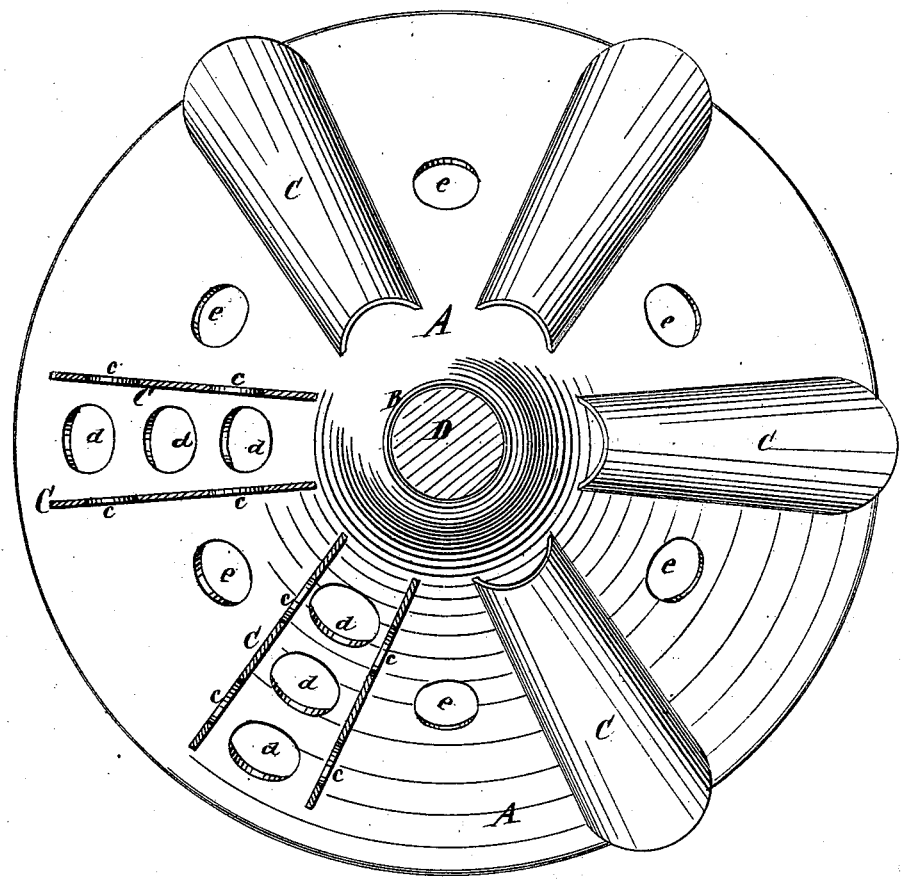
Figure 2:
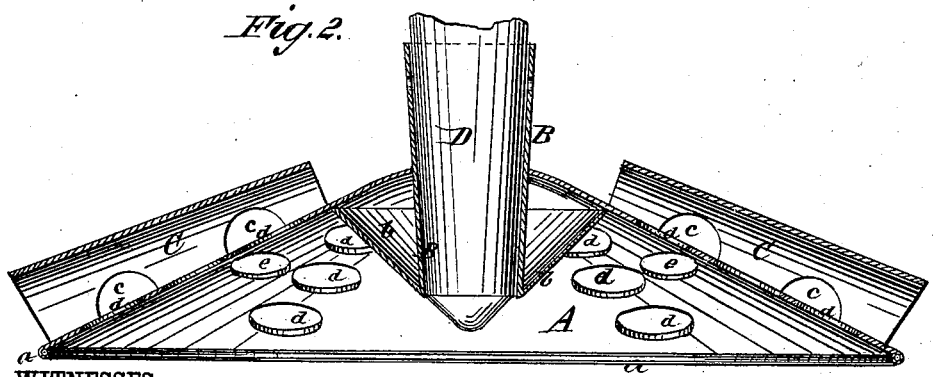

In the accompanying drawing, Figure 1 represents a top view, and Fig. 2 a vertical section, of my improved churn-dasher.

Similar letters of reference indicate corresponding parts.

A is a conical plate, made of tinned iron and rounded off on its apex, its altitude being less than the radius of its base, so that its opposite sides would form an obtuse angle at the apex. The base of the cone A is strengthened by a circumferential wire, $a$, and in the axis or apex a tube, B, or socket is inserted and secured by a small surrounding inverted conical plate, $b$, soldered to the lower end of the tube B, and with its base to the inside of the cone A.

Upon the conical plate A, and radiating from its central portion, are soldered at intervals tapering tubes C, of semicircular cross-section and open at both ends. These tubes C are provided on opposite sides with semicircular holes $c$, adjoining the plate A. Directly beneath or in the bottom of the tubes C the cone-plate A has one or more holes, $d$, through it. The plate A has also a perforation, $e$, made through it between every two adjacent tubes C.

D is the rod or handle of the dasher.

In churning, the cream is forced by the center cone, $b$, to the sides of the dasher; thence through the holes $d$ $e$. The caps or tubes C break the streams, causing the upward jet through the holes $e$ to be impinged on by the side jets issuing from the tubes C through the holes $c$, thus promoting the agitation of the cream and the formation of butter.

By the peculiar shape of the dasher the globules of butter will be collected and concentrated to a solid mass as fast as they are formed, and, the surface of the dasher being smooth and metallic, without recesses where any thing might lodge, the dasher is easily cleaned by simply pouring warm water on it. The tapering shape of the caps C prevents their being clogged up.

Having thus described my invention, I claim as new and desire to secure by Letters Patent—

A churn-dasher formed of the obtusely conical plate A, having the axial tube or socket B, and the inverted central inner cone, $b$, and covered at intervals with the radial semicircular tubes C, tapering toward the central socket, and provided with the side apertures $c$, the said cone A being provided under and between the tubes C with the holes $d$ $e$, substantially as shown and described, and for the purpose set forth.

CHARLES FRIEDEBORN.

Witnesses:
 A. A. SHAVER,
 J. W. CASKINS.